(12) United States Patent
Courtis et al.

(10) Patent No.: US 6,272,361 B1
(45) Date of Patent: Aug. 7, 2001

(54) RADIO TELEPHONE

(75) Inventors: Nicholas John Courtis, Surrey; David Keith Bye, Hampshire; Eric Thomas Ronney, Berkshire, all of (GB)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/114,822

(22) Filed: Jul. 13, 1998

(30) Foreign Application Priority Data

Jul. 16, 1997 (GB) .................................................. 9714856

(51) Int. Cl.[7] ....................................................... H04B 1/38
(52) U.S. Cl. ............................ 455/569; 455/564; 455/563; 455/550; 379/433
(58) Field of Search ..................................... 379/420, 432, 379/52, 355, 354, 88.23, 93.23, 433, 434, 456; 455/550, 568, 569, 564, 563, 90, 74, 74.1, 422, 403

(56) References Cited

U.S. PATENT DOCUMENTS

| 4,591,661 | * | 5/1986 | Benedetto et al. ................... 455/569 |
| 5,267,308 | | 11/1993 | Jokinen et al. ...................... 379/354 |
| 5,481,595 | | 1/1996 | Ohashi et al. ......................... 379/67 |
| 5,684,873 | | 11/1997 | Tiilikainen ......................... 379/354 |
| 5,710,810 | | 1/1998 | Tiilikainen ......................... 379/355 |
| 5,943,627 | * | 8/1999 | Kim et al. ........................... 455/569 |
| 5,978,689 | * | 11/1999 | Tuoriniemi et al. ................ 455/569 |
| 5,991,637 | * | 11/1999 | Mack II et al. .................... 455/550 |

FOREIGN PATENT DOCUMENTS

| 4-306944 | * | 10/1992 | (JP) . |
| WO 94/01958 | | 1/1994 | (WO) . |

OTHER PUBLICATIONS

Patent Abstracts of Japan, JP4306944 A, vol. 17, No. 137, p. 59.

United Kingdom Search Report.

* cited by examiner

Primary Examiner—Tracy Legree
(74) Attorney, Agent, or Firm—Perman & Green, LLP

(57) ABSTRACT

A portable radio telephone is provided with a headset having a user actuable switch and an earpiece. The handset of the radio telephone includes circuitry for responding to the operation of the headset by the user to select a telephone number stored in the radio telephone.

20 Claims, 8 Drawing Sheets

| MEMORY LOCATION | VOICE TAG | NAME | TELEPHONE NUMBER |
|---|---|---|---|
| 1 | "John" | John Waghorn | 0181 943 3222 |
| 2 | "Mark" | Mark Wright | 01734 461842 |
| 3 | "Marlon" | Marlon Brando | 01276 489989 |
| 4 | "Philip" | Philip Tye | 0898 464842 |

RADIO TELEPHONE

BACKGROUND OF THE INVENTION

The present invention relates to a radio telephone. In particular, the invention relates to a radio telephone including a headset with a user actuable switch.

Radio telephones are known to operate with headsets which may be plugged into the handset of the radio telephone to provide a handsfree talking facility. For example, the NOKIA® 8110 Handportable Cellular Phone available from Nokia Mobile Phones Ltd. may operate using the NOKIA HDXK-8 Headset. This headset is shown in FIG. 1 and includes an in-ear speaker 10, an in-line microphone 11, a lead 12, a crocodile clip 13 for securing the lead 12 to an item of clothing, and a connector 14 for plugging into a jack on the adaptor 15. The adaptor 15 has a connector 16 for connecting the headset to the system connector of a NOKIA 8110 Phone.

SUMMARY OF THE INVENTION

An object of the present invention is to provide an improved user interface for a radio telephone incorporating a headset.

According to the present invention there is provided a portable radio telephone comprising a headset having a user actuable switch and an earpiece, and selection means, responsive to control information input by a user via the switch and, in response to said control information, providing via the earpiece information relating to telephone numbers stored in the radio telephone, for enabling a user to select one of a plurality of telephone numbers stored in the radio telephone.

A portable telephone in accordance with the invention may have an advantage that it allows a user to select telephone numbers for dialling using the switch and earpiece of the headset without having to view a display and/or operate a keypad on the radio telephone handset. A user can thus select and dial telephone numbers conveniently using the headset even when another part of the radiotelephone is out of reach or not easily accessible. Furthermore, a radiotelephone in accordance with the invention may allow a user to select a telephone number and initiate a call in situations where conventional use of a handset would be inconvenient, such as when walking in a busy street.

A radio telephone in accordance with the invention may dispense with the conventional keyboard and/or display typically found on a radio telephone handset. Instead, the functions of the keypad and/or display may be provided by the headset.

Ideally, the radio telephone comprises a main body portion, and the selection means may be located in this main body portion.

The headset may comprise a lead for coupling the headset to the main body portion. Ideally, the switch is positioned on this headset lead, with the lead providing the electrical coupling between the switch and the selection means.

Preferably, the lead is detachable from the main body portion. This may allow the headset to be unplugged from the main body portion and stored when not required.

Preferably, the switch is a push button. This may provide the advantage of allowing a user to discreetly and/or repeatedly activate the switch. Other forms of switch could also be used such as a toggle switch or a sliding switch.

Suitably the headset further comprises a microphone, preferably positioned on the lead, allowing a user to perform two-way communication via the headset.

To provide a comfortable and discreet headset, it is possible for the earpiece to be an in-ear style earpiece.

Suitably, the main body portion of the radio telephone contains a transceiver and is in the form of a handset comprising a separate earpiece and microphone.

Preferably, the selection means provides via the earpiece recorded voice tags associated with telephone numbers stored in the telephone. These voice tags may be embedded in the memory of the telephone during production and/or may be recorded in re-writable memory by a user.

As an alternative the selection means may provide via the earpiece synthesised voice tags associated with telephone numbers stored in the telephone.

BRIEF DESCRIPTION OF THE DRAWINGS

Embodiments of the invention will now be described, by way of example, with reference to the accompanying drawings, in which.

DETAILED DESCRIPTION OF THE INVENTION

Figure 1:
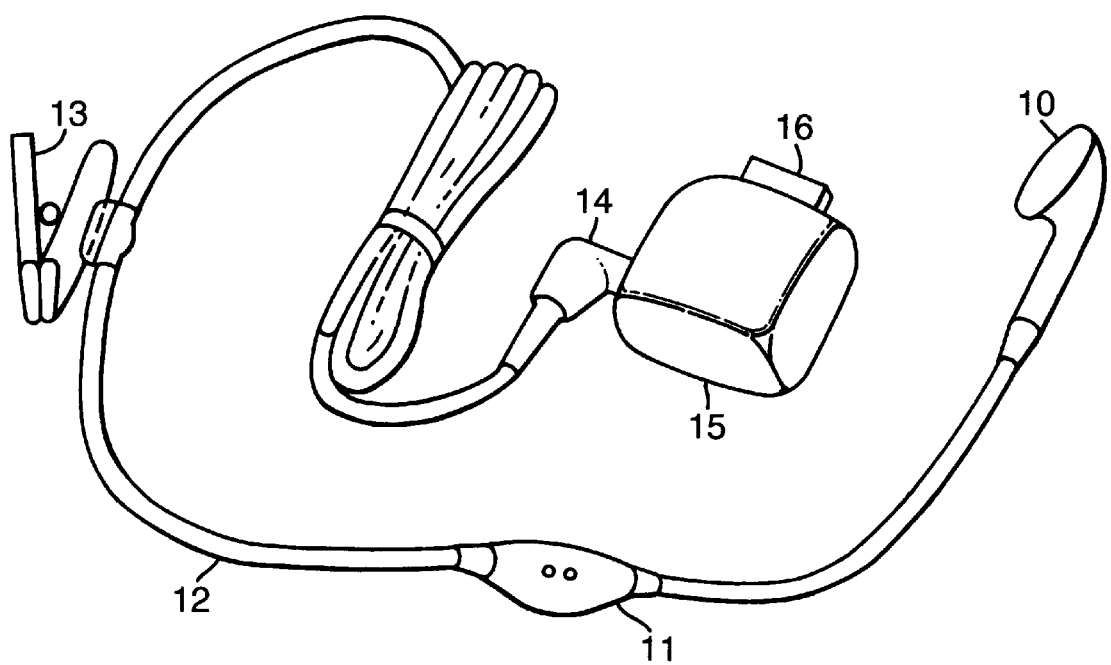
FIG. 1 is a perspective view of a prior art NOKIA HDXK-8 Headset.
Figure 2:
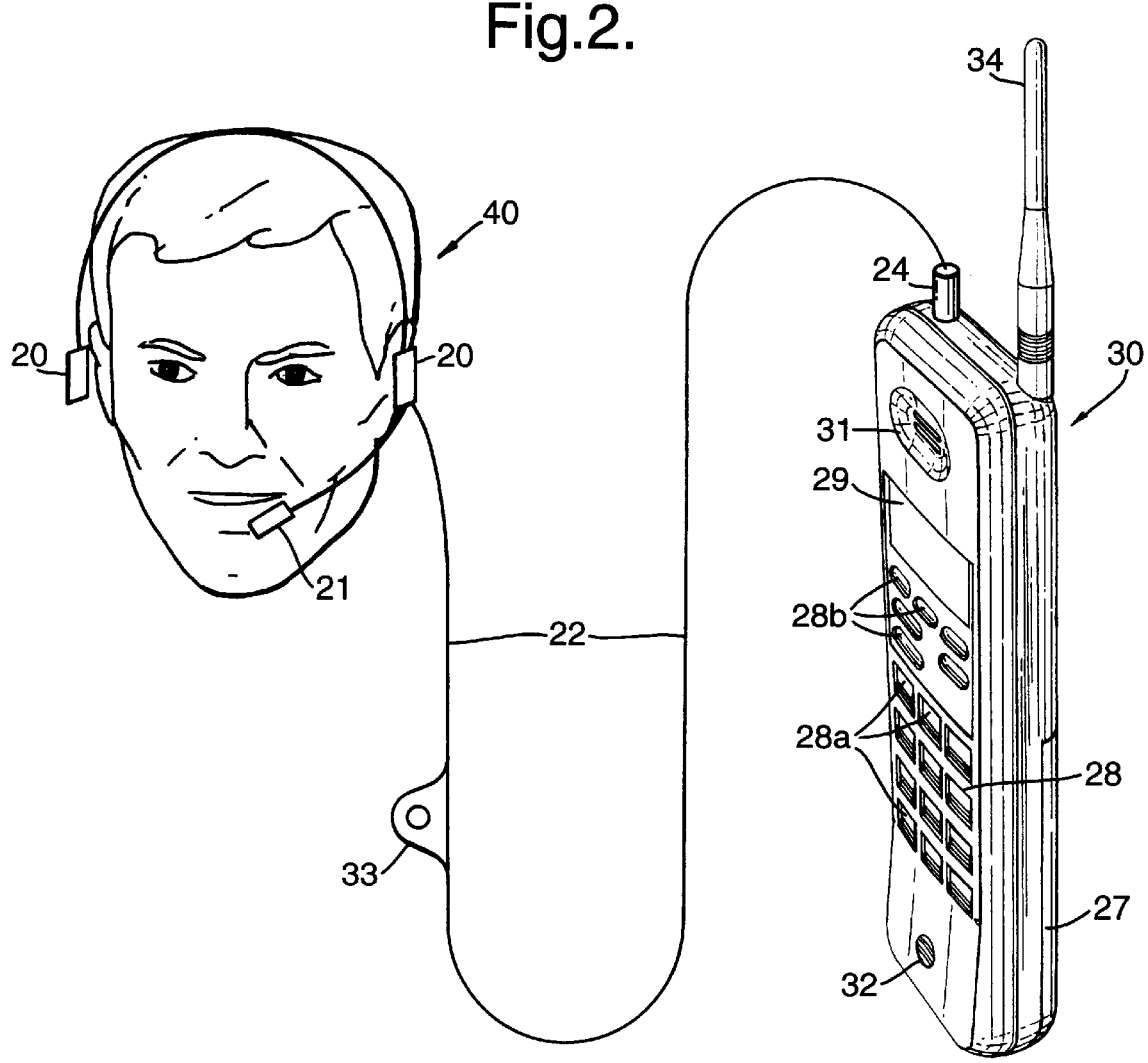
FIG. 2 is a view of a portable radiotelephone in accordance with the invention with the headset positioned on a head of a user.
Figure 3:
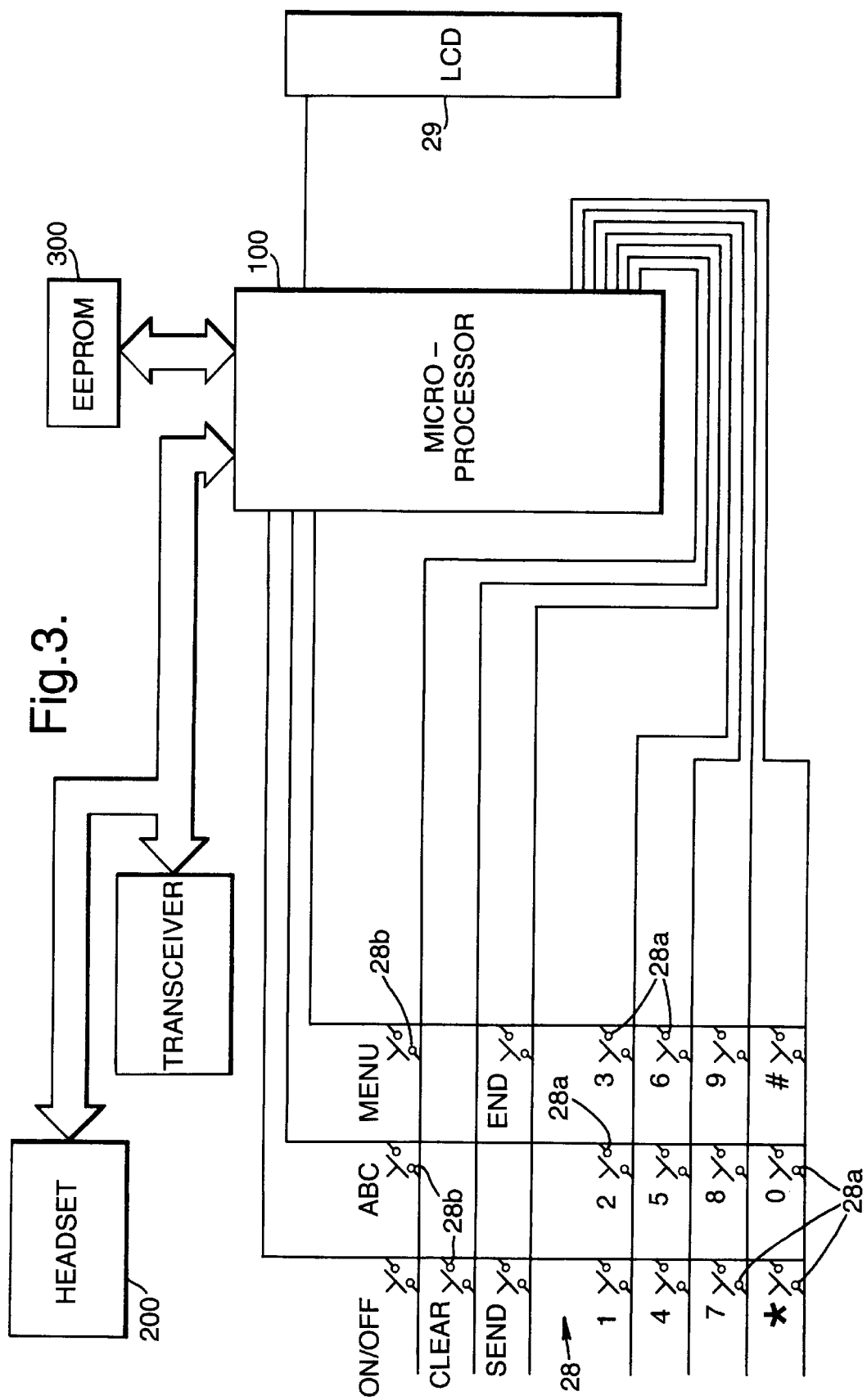
FIG. 3 is a schematic diagram of the keypad, microprocessor, and major functional elements of the handset of FIG. 2.

Referring to FIG. 2, there is shown a portable radiotelephone comprising a telephone handset 30 and a headset 40. The telephone handset 30 is a handportable cellular phone powered by a removable rechargeable battery pack 27. The handset 30 includes an antenna 34 coupled to a transceiver unit, a microphone 32, a speaker 31, and all the other features conventionally found in a cellular phone. Referring also to FIG. 3, a microprocessor 100 is employed to control all the basic functions of the handset and to control the keypad, display and headset functions. Alternatively, however, the telephone functions may be controlled by a master microcomputer, while the keypad, display and headset functions are under the control of separate slave microcomputers coupled to communicate with the master microcomputer.

The user-interface of handset 30 comprises a display, e.g. a liquid crystal display 29, itself well-known in the art and a keypad 28 on the front of the handset 30. The display is coupled to and regulated by the microprocessor 100 in the usual manner. The keypad 28 essentially comprises two main sets of keys, namely alpha-numeric keys 28*a* associated with alpha-numeric data especially for dialling telephone numbers, but also for entering alphanumeric data into the telephone memories; and a set of function keys 28*b* for enabling various predetermined functions or operations.

The keys 28*a* are arranged in four rows of three keys each. As is conventional for the numeric key layout of a telephone, the top row comprises keys for numbers 1, 2 and 3 respectively, the second row down for numbers 4, 5 and 6 respectively, the next row down for numbers 7, 8 and 9 respectively, and the bottom row for *, 0 and # respectively. Some or all of these keys may also be associated with alphabet information, as again is quite conventional. The alphabetic rather than numeric data is selected for example by preceding the alphanumeric keystrokes with another predetermined keystroke such as the "ABC" function key.

As is usual in cellular telephones, the keys 28*b* include a "SEND" and "END" key for respectively initiating and terminating a telephone call. Another key, specifically located in the top left-hand corner is an "ON/OFF" key for turning the telephone on and off. Another of the function keys may be a menu or function key labelled, for example, "MENU" or "FUNCTION" or with a suitable abbreviation thereof. Depression of this key enables a variety of pre-set menus, the related instructions of which are stored in memory, to be viewed on display 29 and selectively enabled. The various menus may be selected by depressing the appropriate alphanumeric keys after depressing the "MENU" or "FUNCTION" key. The relevant menu is shown to the user in words or abbreviations on the display panel 29. For example, the user may be able to select the ringing tone by appropriate menu selection. More sophisticated options may also be available via the menu facility. For example, the user may be able to enable the so-called Automatic Redial mode which repeats a call attempt if a telephone number is busy or there is no answer. In accordance with the present invention special menu facilities are provided to permit manual selection of various headset modes. Any predetermined sequence of keystrokes may be employed to select the respective menus which may display legends such as "HEADSET DIALLING" or "HEADSET NUMBER GENERATION" on the display panel 5.

The headset 40 shown in FIG. 2 includes two earpieces 20, and a microphone 21 positioned at the end of a boom. A lead 22 joins the earpieces 20 and the microphone 21 to a connector 24. Located part way along the lead is a push button switch 33 which is conveniently positioned for activation by a user's thumb or finger. The connector 24 plugs into a headset jack on the telephone handset 30 which in turn is electrically coupled via a suitable headset interface 200 to the microprocessor 100. The lead 22 provides electrical coupling between the connector 24 and the earpieces 20, the microphone 21, and the switch 33 of the headset 40. Consequently, when the headset 40 is plugged into the handset 30 the earpieces 20, the microphone 21, and the switch 33 become electrically coupled to microprocessor 100. The headset 40 may be unplugged from the handset 30 when not required.

Figures 8, 9:
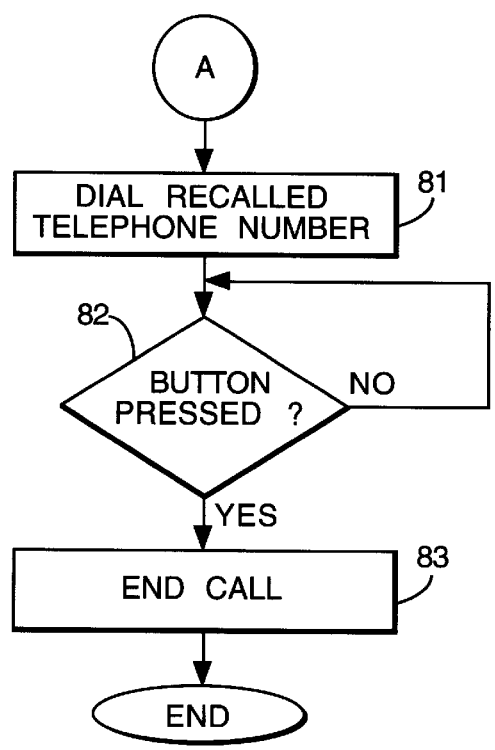
FIG. 8 is a flowchart showing how a selected telephone number may be called and how the call may be ended using the button of the headset shown.
FIG. 9 is a table showing information stored in memory locations 1 to 4 in the handset of FIG. 2.

To assist a user in recalling telephone numbers for subsequent dialling, the handset 30 contains a non-volatile memory such as an EEPROM memory 300 coupled to the microprocessor enabling a user to store in the radiotelephone 30 information relating to those telephone numbers. The EEPROM stores the information in a database format with each record containing information relating to a particular telephone number. Other forms of non-volatile memory, for example flash memory or battery backed-up RAM, could be used instead of the EEPROM. FIG. 9 is a table showing four records or memory locations in the EEPROM memory of the handset. Each memory location contains a voice tag, a name, and a telephone number. The voice tag is recorded as a sound waveform which is typically a sample of the user's voice received by the microphone 32. This waveform may be replayed by a speaker of the radiotelephone. The name and telephone number may be entered into the EEPROM memory by a user via the alphanumeric keys 28*a* of the keypad 28 as is conventional.

The radiotelephone provides a feature whereby a user may generate using the headset the voice tags, names, and/or telephone numbers for subsequent storage in the EEPROM. This feature may be selected from the menus of the radiotelephone by the user operating the keypad 28 in the usual way. Following selection of this feature the user presses the button 33 on the headset and may be prompted by a sound or voice in the earpiece 20 to speak the voice tag into the microphone 31 of the headset. The voice input is received by the microprocessor via the headset interface 200 and is recorded as a voice tag in the next available memory location of the EEPROM. The button 33 on the headset is then used to confirm the voice tag input. Next the user enters the name and the telephone number into the microphone 31 in a similar way to complete the entry in the memory location. The microprocessor is conditioned with a speech recognition algorithm for deciphering the name and telephone number from the name and telephone number voice waveforms entered into the microphone 31. After completing an entry into the EEPROM via the headset, the radiotelephone may optionally replay the entry to the user automatically via the earpiece 20 using a voice synthesiser. Further entries may also be input into the EEPROM.

The radiotelephone also provides a feature whereby a user may generate a telephone number and subsequently dial the telephone number using the headset. With this feature selected in the handset, the user presses the button 33 on the headset and may be prompted via a sound or voice in the earpiece to speak the telephone number which the user wishes to dial. The user's voice input is then received by the microphone 21 and is processed using the microprocessor, suitably conditioned with a speech recognition algorithm, to generate the telephone number in the radiotelephone. The telephone number generated by the speech recognition may be replayed to the user via the earpiece using a voice synthesiser. A long press of the button on the headset by the user is then used to initiate dialling of the generated telephone number.

A radiotelephone may provide various methods for a user to select and then dial telephone numbers stored in the radiotelephone. Preferred methods for selecting a telephone number are shown in the flowcharts of FIGS. 4 to 7. These methods generally depend on voice tags and telephone numbers being previously stored in the memory of the radio telephone. The preferred method for dialling selected telephone numbers is shown in the flowchart of FIG. 8. Each of the selection flowcharts of FIGS. 4 to 7 proceed to the dialling flowchart of FIG. 8 (see label A).

Figure 4:
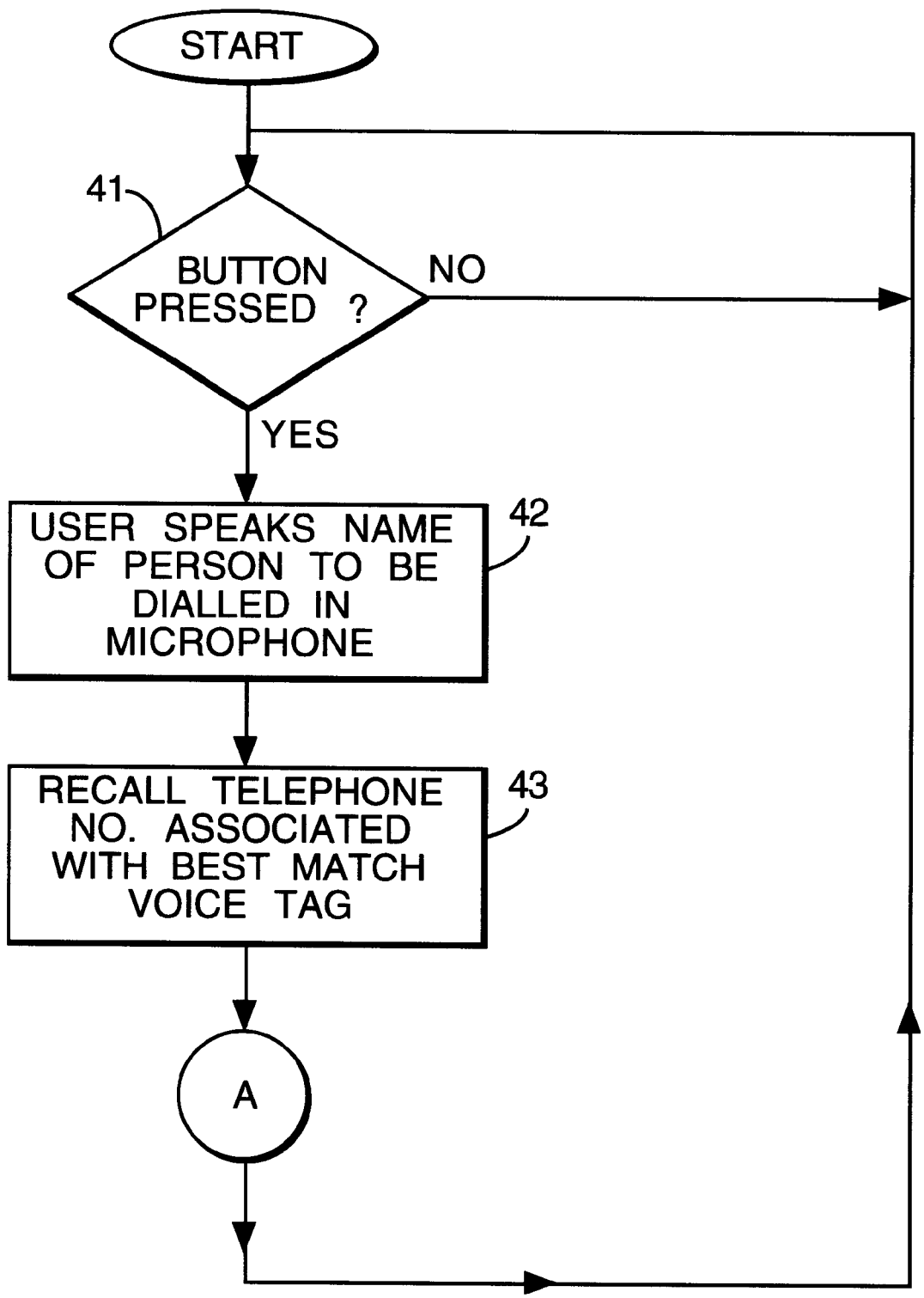
FIG. 4 is a flowchart showing how a telephone number may be selected using the button and microphone of the headset shown in FIG. 2.

Referring to the selection flowchart in FIG. 4, the first step 41 requires the microprocessor to detect whether the button on the headset has been pressed. This first step is common to all the flowcharts of FIGS. 4 to 7. In step 42 the user speaks into the microphone 21 the voice tag associated with the telephone number the user wishes to dial. In step 43 the microprocessor compares the waveform input by the user with all the voice tag waveforms stored in the EEPROM and selects the voice tag with the best waveform match. The telephone number stored in the same memory location as the best matching voice tag is then recalled from the EEPROM.

The preferred method for comparing waveforms input by the user and the waveforms stored in the EEPROM involves identifying or extracting unique characteristics associated with the waveforms. Comparison of these unique characteristics is then performed to determine the waveforms with the best match. The unique characteristics are chosen so that they are substantially independent of the amplitude and length of the waveforms, enabling consistent matching of waveforms even when, for example, a user speaks a name quietly or slowly. In speech recognition the same unique characteristics of the input waveforms may be extracted to determine what words were spoken.

Figure 5:
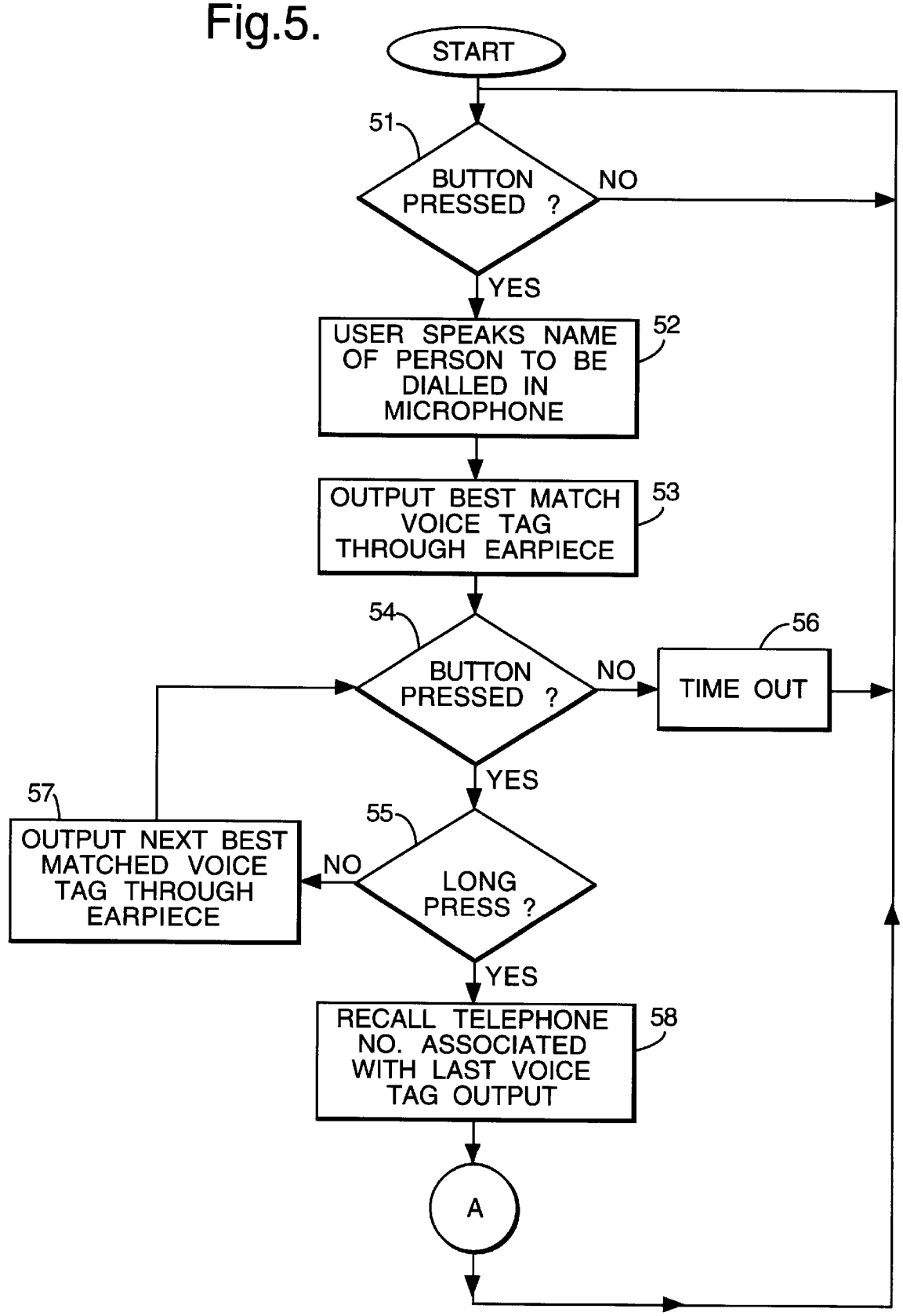
FIG. 5 is a flowchart showing how a telephone number may be selected using the button, microphone, and earpiece of the headset shown in FIG. 2.

Referring now to the selection flowchart in FIG. 5, steps 51 and 52 are equivalent to steps 41 and 42 in the flowchart of FIG. 4. In step 53 the microprocessor compares the waveform input by the user with all the voice tag waveforms stored in the EEPROM and selects the voice tag with the best waveform match. The voice tag with the best match is then output through the earpiece 20 of the headset. The user now has three options represented by the steps 54 and 55. The first option for the user is not press the button on the headset whereby the selection is timed out, see step 56. The second option for the user is a short press of the button on the headset. This invokes step 57 whereby the microprocessor compares the waveform input by the user with all the voice tag waveforms stored in the EEPROM and selects the voice tag with the next best waveform match. The voice tag with the next best match is then output through the earpiece 20 of the headset and the user once again has three options represented by the steps 54 and 55. The third option for the user is a long press of the button on the headset whereby step 58 is performed, i.e. the telephone number stored in the same memory location as the last voice tag output is recalled from the EEPROM.

Figure 6:
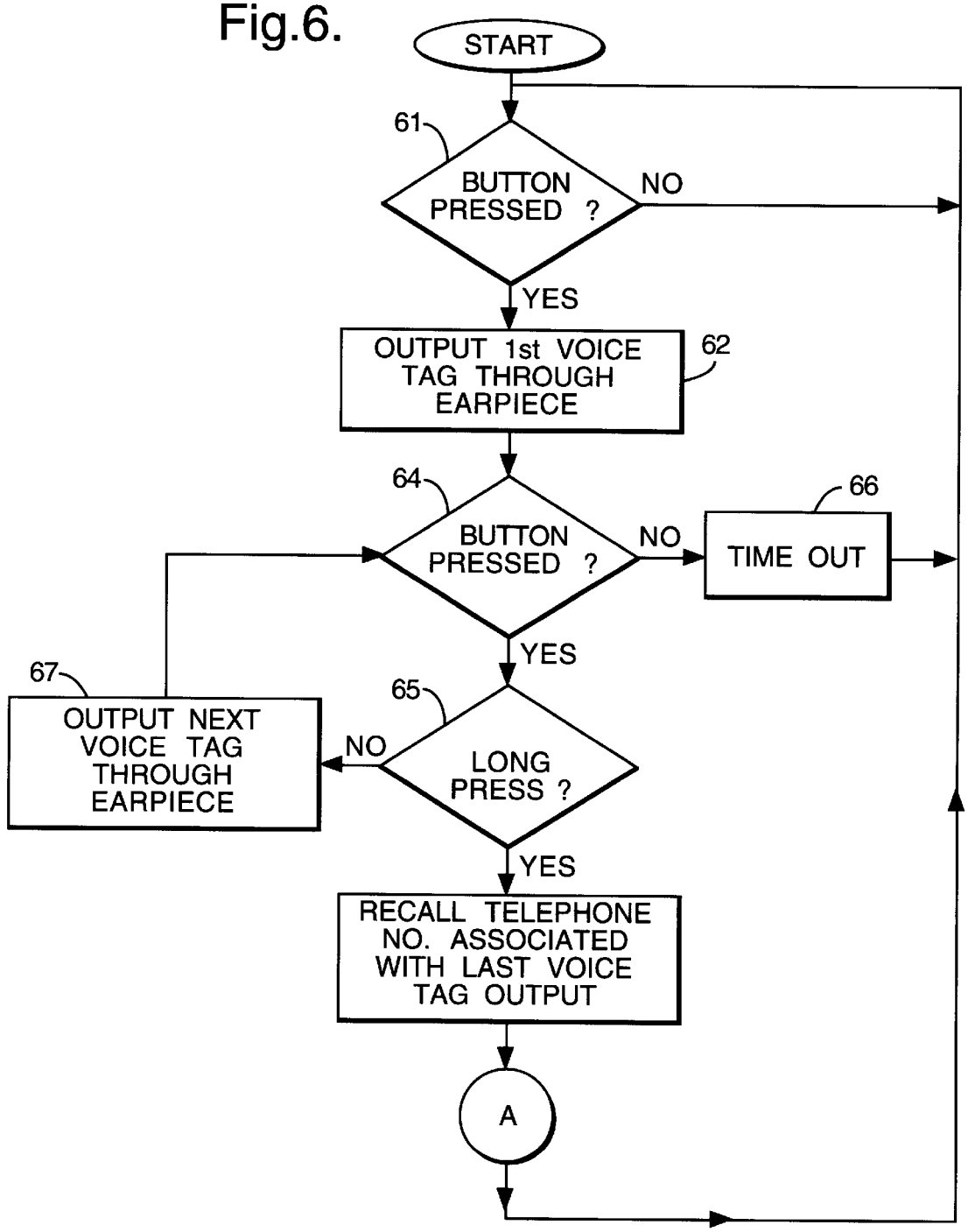
FIG. 6 is a flowchart showing how a telephone number may be selected using the button and earpiece of the headset shown in FIG. 2.

Referring now to the selection flowchart in FIG. 6, step 61 is equivalent to steps 41 in the flowchart of FIG. 4. In step 62 the microprocessor retrieves the voice tag stored in the first memory location in the EEPROM and outputs the first voice tag through the earpiece of the headset. The user now has three options represented by the steps 64 and 65. These options are equivalent to the user options represented by the steps 54 and 55 in the selection flowchart of FIG. 5. However, when the user selects the second option, i.e. a short press of the button on the headset, step 67 is invoked whereby the microprocessor retrieves the voice tag stored in the next memory location in the EEPROM and outputs this voice tag through the earpiece of the headset. Then the user once again has three options represented by the steps 64 and 65. Thus a user may scroll sequentially through the voice tags until the desired one is output through the earpiece. When the desired voice tag is output the telephone number stored in the same memory location as the last voice tag output may be recalled from the EEPROM by a long press of the button.

Figure 7:
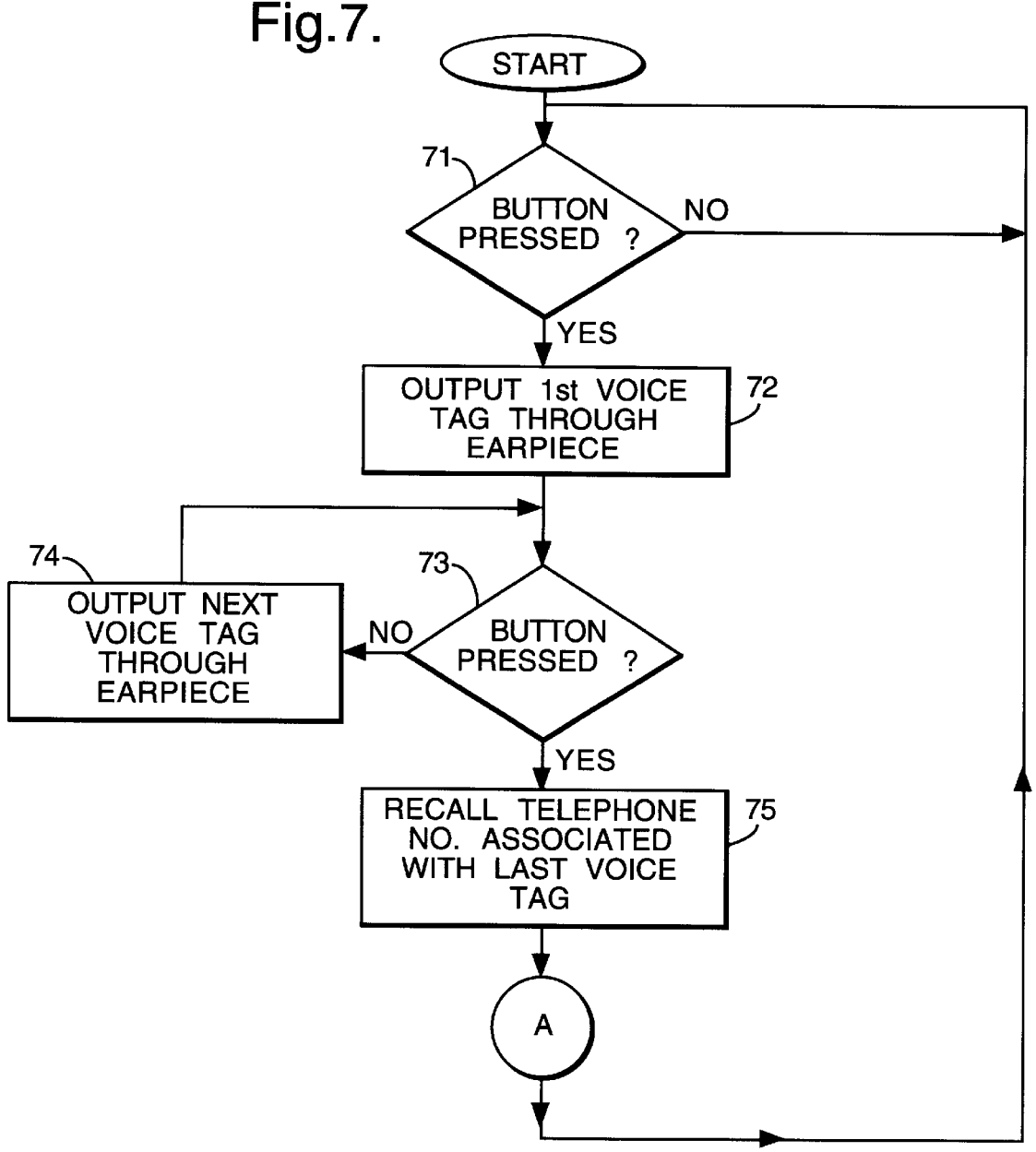
FIG. 7 is another flowchart showing how a telephone number may be selected using the button and earpiece of the headset.

Referring now to the selection flowchart in FIG. 7, steps 71 and 72 are equivalent to steps 61 and 62 in the flowchart of FIG. 6. In step 73 the user may choose to accept the last voice tag output by the earpiece 20 by pressing the button within an allotted period of time, for example two seconds. If the user does not choose to accept the last voice tag by pressing the button then the flowchart proceeds to step 74 whereby the microprocessor retrieves the voice tag stored in the next memory location in the EEPROM and outputs this voice tag through the earpiece of the headset. The process then returns to step 73 at which point the user may choose to accept the last voice tag output as before by pressing the button. Thus the voice tags stored in the EEPROM are scrolled automatically and sequentially by the microprocessor until the desired one is accepted by the user. When the user accepts a voice tag the telephone number stored in the same memory location as the voice tag is recalled from the EEPROM by the microprocessor, see step 75. Optionally, the user may press the button for a long period in order to cancel the automatic scrolling of the voice tags.

In the selection flowcharts previously described a telephone number is typically recalled from the EEPROM, Once this has been achieved the telephone number may be dialled automatically by the radio telephone as shown by step 81 in the flowchart of FIG. 8. Steps 82 and 83 show how a user may end the call by pressing the button on the headset.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A portable radio telephone comprising
   a headset having a manual user actuable switch and an earpiece, and
   selection means, responsive to control information input by a user via the switch and, in response to said control information, providing via the earpiece information relating to telephone numbers stored in the radio telephone, for enabling a user to select one of a plurality of telephone numbers stored in the radio telephone.

2. A portable radio telephone as claimed in claim 1, wherein the selection means provides via the earpiece voice tags associated with telephone numbers stored in the telephone.

3. A portable radio telephone as claimed in claim 2, wherein the voice tags are prerecorded.

4. A portable radio telephone as claimed in claim 2, wherein the voice tags are synthesised.

5. A portable radio telephone as claimed in claim 1, wherein the radio telephone comprises a main body portion.

6. A portable radio telephone as claimed in claim 5, wherein the selection means is located in the main body portion.

7. A portable radio telephone as claimed in claim 5, wherein the headset comprises a lead for coupling to the main body portion.

8. A portable radio telephone as claimed in claim 7, wherein the switch is positioned on the lead.

9. A portable radio telephone as claimed in claim 7, wherein the switch is coupled to the selection means via the lead.

10. A portable radio telephone as claimed in claim 7, wherein the lead is detachable from the main body portion.

11. A portable radio telephone as claimed in claim 7, wherein the main body portion of the radio telephone comprises a transceiver.

12. A portable radio telephone as claimed in claim 7, wherein the main body portion of the radio telephone is a handset.

13. A portable radio telephone as claimed in claim 7, wherein the main body portion comprises an audio interface comprising an earpiece and a microphone.

14. A portable radio telephone as claimed in claim 1, wherein the earpiece is an in-ear style earpiece.

15. A portable radio telephone as claimed in claim 1, wherein the switch is a push button.

16. A portable radio telephone as claimed in claim 1, wherein the headset further comprises a microphone.

17. A portable radio telephone comprising:

a main body portion;

a headset having a manual user actuable switch an earpiece and a lead for coupling to the main body portion; and selection means, responsive to control information input by a user via the switch and, in response to said control information providing via the earpiece information relating to telephone numbers stored in the radio telephone, for enabling a user to select one of a plurality of telephone numbers stored in the radio telephone.

18. A portable radio telephone as claimed in claim 17, wherein said switch is positioned on said lead.

19. A portable radio telephone as claimed in claim 17, wherein said switch is coupled to said selection means via said lead.

20. A portable radio telephone as claimed in claim 17 wherein said lead is detachable from said main body portion.

\* \* \* \* \*